March 17, 1959     H. M. RUSH     2,877,660
SINGLE ACTUATOR FOR A PLURALITY OF CONTROL DEVICES
Filed June 11, 1956     2 Sheets-Sheet 1

INVENTOR.
Hugh M. Rush
BY
Agent

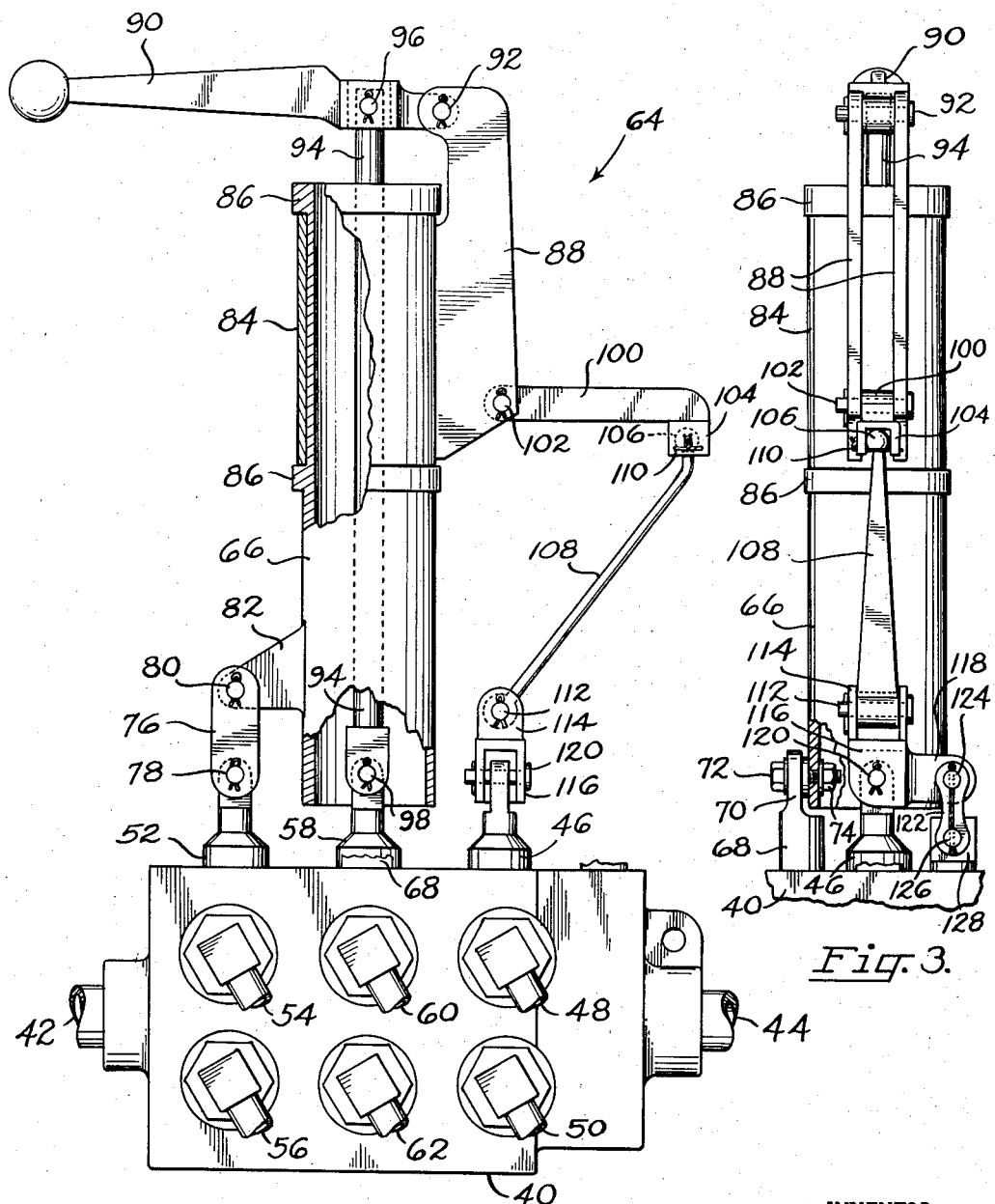

United States Patent Office
2,877,660
Patented Mar. 17, 1959

2,877,660

SINGLE ACTUATOR FOR A PLURALITY OF CONTROL DEVICES

Hugh M. Rush, Elkhart, Ind., assignor of one-half to Shannon K. Clements, Elkhart, Ind.

Application June 11, 1956, Serial No. 590,551

11 Claims. (Cl. 74—471)

This invention pertains to control devices, and relates particularly to a single actuator for a plurality of independent control devices such as fluid pressure control valves.

There are many and diverse types of apparatus which function, for example, to move an object in various directions. Among such apparatus are included power operated shovels, cranes, personnel supporting booms, and many others. In the operation of such apparatus it is generally required that individual controls be manipulated to move the object in any one direction, since such movement in a given direction generally is effected by operation of an independent power source. Thus, for example, in the operation of a personnel supporting boom, independent power sources and controls generally are employed to effect movement of the personnel in vertical, transverse and rotational directions with respect to the underlying support.

It is a principal object of the present invention to provide a single actuator for operating a plurality of independent control devices such as fluid pressure valves.

Another important object of this invention is the provision of a single actuator for a plurality of independent control devices, by which single actuator any one or combination of said control devices may be operated selectively.

A further important object of this invention is to provide, in combination with a plurality of independent control devices such as fluid pressure valves, each of which is adapted to control the movement of an object in a different direction, a single actuator therefor arranged in such manner as to cause movement of the object in the same direction as the actuator is moved.

Still another object of this invention is to provide a single actuator for operating a plurality of independent control devices, which actuator and control devices are interconnected mechanically but separated electrically.

A still further important object of the present invention is to provide a single control for a plurality of independent fluid pressure valves, which control is of simplified construction for economical manufacture, and which is adaptable for use with conventional multi-valve assemblies.

The foregoing and other objects and advantages of the present invention will appear from the following detailed description, taken in connection with the accompanying drawings, in which:

Figure 2 is a view in side elevation of a multiple valve assembly and a single actuator therefor embodying the features of this invention, parts of said actuator being broken away to disclose details of construction;

Figure 3 is a fragmentary elevational view of the multiple valve assembly and single actuator therefor, as viewed from the right in Figure 2, parts thereof being broken away to disclose details of construction.

Figure 1:
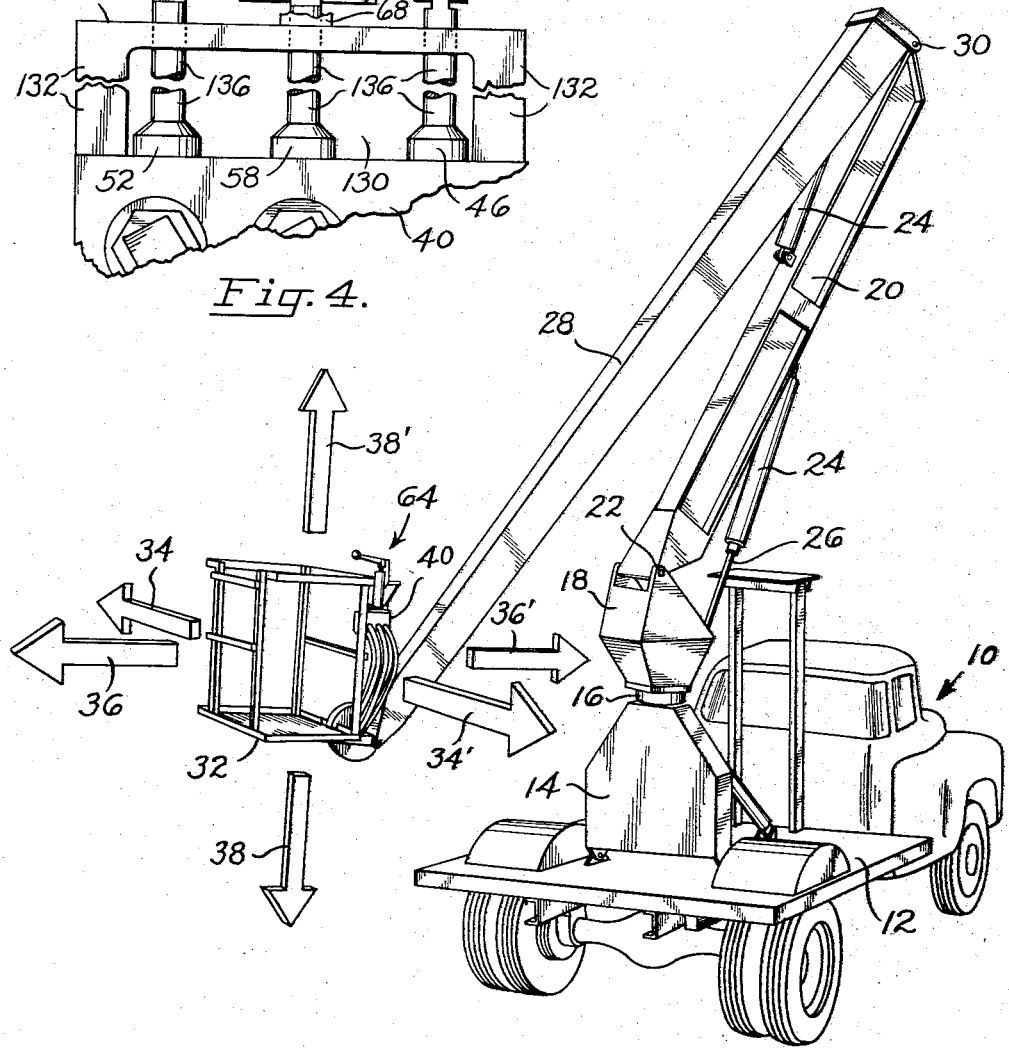
Figure 1 is a perspective view of a personnel supporting boom mounted upon a vehicle for movement in the directions indicated by the arrows, the boom being provided with multiple valves and a single actuator embodying the features of the present invention.

In order to illustrate the purpose and function of the single actuator of the present invention, there is shown in Figure 1 a typical form of apparatus with which the multiple valve assembly and single actuator is of particular utility. In the illustration, a truck 10 supports upon its flatbed 12 an upstanding housing 14 in which is mounted a rotatable base, or turntable 16. The turntable is driven by means of a suitable motor, preferably a fluid pressure operated motor mounted within the housing 14. An upstanding bracket 18 is secured to the turntable and pivotally supports the lower end of the lower boom member 20, as by means of the pivot shaft 22. A fluid pressure operated motor pivotally interconnects the bracket 18 and lower boom member 20 for pivoting the latter on the shaft 22. In the embodiment illustrated, the motor comprises an elongated cylinder 24, pivotally connected at one end to the boom member 20, and a piston rod 26 pivotally connected at its outer end to the bracket 18. The inner end of the piston rod is connected to a piston mounted slidably within the cylinder 24 and movable therein under the influence of fluid pressure introduced into the cylinder selectively on opposite sides of the piston, in manner well-known in the art.

An upper boom member 28 is pivotally connected at one end, as by means of the pivot shaft 30, to the outer end of the lower boom member 20. These boom members are also interconnected pivotally by a fluid pressure operated motor, such as the assembly of cylinder 24 and piston rod 26 described hereinbefore.

The outer end of the upper boom member 28 pivotally supports a work platform 32. The work platform is mounted in such manner as to be maintained automatically in a horizontal position during movement of the boom members. Mechanism performing this function is not disclosed herein because it forms no part of the present invention.

From the foregoing, it will be apparent that the boom assembly illustrated provides for movement of the work platform 32 in three directions, namely rotation on a horizontal plane about the axis of turntable 16, indicated in Figure 1 by arrows 34 and 34'; movement transversely of or horizontally radial with respect to the axis of the turntable, indicated by arrows 36 and 36'; and movement vertically with respect to the turntable, indicated by arrows 38 and 38'. These motions are effected by operation of the turntable motor, the fluid pressure operated motor interconnecting the bracket 18 and lower boom member 20, and the fluid pressure operated motor interconnecting lower boom member 20 and the upper boom member 28, respectively. These motors are connected independently of each other to a source (not shown) of fluid pressure by means of separate control valves, and it is the selective operation of these valves by a single actuator that the present invention is primarily concerned.

Referring now particularly to Figure 2 of the drawings, there is shown a valve housing 40, having a fluid pressure inlet opening 42 and an exhaust opening 44. The housing contains three valves which are mounted for sliding movement transversely of the longitudinal dimension of the housing. One of these valves 46 is associated with a pair of feed outlets 48, 50 which are connected to the turntable motor in the following manner: When the valve 46 is moved inwardly from the neutral position shown in Figure 2, fluid pressure is delivered from the inlet 42 through feed outlet 48 to the turntable motor, whereby to rotate the turntable in the clockwise direction 34 in Figure 1. The turntable motor is exhausted through feed outlet 50 and exhaust outlet 44. Conversely, when the valve 46 is moved outwardly from the neutral postion shown in Figure 2, fluid pressure is delivered to the turntable motor through inlet 42 and feed outlet 50, thereby driving the turntable in the counter clockwise direction 34' of Figure 1, the motor being exhausted through feed outlet 48 and exhaust outlet 44.

A second valve 52 in the housing 40 is associated with a pair of feed outlets 54, 56 which are connected to the opposite ends of the cylinder 24 associated with the bracket 18 and lower boom member 20. These connections are made in such manner that when the valve 52 is moved inwardly from the neutral position shown in Figure 2, fluid presure is delivered to the cylinder 24 through inlet 42 and feed outlet 54 in such manner as to extend the piston rod 26 and move the platform 32 radially outward from the turntable 16, in the direction of arrow 36 in Figure 1. The cylinder is exhausted through feed outlet 56 and exhaust outlet 44. Conversely, when the valve is moved outwardly from the neutral position shown in Figure 2, fluid pressure is delivered to the cylinder through inlet 42 and feed outlet 56, whereby to retract the piston rod 26 and move the platform 32 toward the turntable 16, in the direction of arrow 36' in Figure 1, the cylinder being exhausted through feed outlet 54 and exhaust outlet 44.

A third valve 58 in the housing 40 is associated with a pair of feed outlets 60, 62 which are connected to the opposite ends of the cylinder 24 associated with the lower boom member 20 and the upper boom member 28. These connections are made in such manner that when the valve 58 is moved inwardly from the neutral position shown in Figure 2, fluid pressure is delivered to the cylinder through inlet 42 and feed outlet 60 in such manner as to retract the piston rod 26 and move the platform 32 vertically downward with respect to the turntable 16, in the direction of arrow 38, the cylinder being exhausted through feed outlet 62 and exhaust outlet 44. Conversely, when the valve is moved outwardly from the neutral position shown in Figure 2, fluid pressure is delivered to the cylinder through inlet 42 and feed outlet 62, whereby to extend the piston rod and move the platform 32 upwardly with respect to the turntable, in the direction of arrow 38'. The cylinder is exhausted through feed outlet 60 and exhaust outlet 44.

In accordance with the present invention, operation of the three valves described hereinbefore is effected by a single actuator indicated generally in the drawings by the reference numeral 64. Referring particularly to Figures 2 and 3 of the drawing, the actuator includes an elongated hollow body 66, which is mounted at its lower end on the valve housing 40. In the embodiment illustrated, this mounting is afforded by means of spaced brackets 68 mounted upon the valve housing and each having an upwardly extending projection 70. A pivot bolt 72 is mounted in each projection and projects through the body 66 on a common axis. The bolts are secured by nuts 74.

Valve 52 is connected pivotally to the body 66 by such means as link 76 which is connected at one end to the upward extension of valve 52 by means of pivot pin 78 and is connected at the opposite end, by means of pivot pin 80, to a projection 82 on the body.

The outer surface of the upper end of body 66 is cylindrical in cross section and receives a sleeve 84 freely thereon for axial rotation. The sleeve is confined between spaced shoulders 86 on the body 66 to prevent longitudinal displacement of the sleeve relative to the body.

A bracket 88 projects radially outward from the sleeve and extends above the body 66. An actuating handle 90 is connected pivotally to the upper end of the bracket 88 by such means as pivot pin 92. Intermediate the ends of the handle 90 an elongated rod 94 is pivotally connected, as by means of pivot pin 96. This rod extends concentrically within the hollow body 66 and is pivotally connected at its lower end, as by means of pivot pin 98, to the upward extension of valve 58. Pivot pin 98 lies on the same axis as pivot bolts 72.

An arm 100 also is secured pivotally at one end, as by means of pivot pin 102, to the bracket 88. The outer end of this arm is constructed to form a socket 104 adapted freely to receive therein a ball 106 formed on the upper end of link member 108. The ball is retained within the socket by such means as the wire 110 which extends across one end of the socket.

The lower end of link 108 is pivotally secured, as by means of pivot pin 112, to the upper section 114 of a connecting element. This upper section is connected to or otherwise formed integral with an intermediate section 116 and a laterally projecting section 118, the latter being offset at substantially right angles with respect to the upper section 114. The intermediate section 116 is pivotally connected, as by means of pivot pin 120, to the upward extension of valve 46. A link 122 is pivotally connected at one end to the lateral projection 118, as by means of pivot pin 124, and the lower end of the link is pivotally secured, as by means of pivot pin 126, to an upstanding bracket 128 on the valve housing 40.

From the foregoing description of the valve assembly and single actuator, the following operations will be apparent, it being assumed for purposes of this illustration that the assembly is mounted upon the platform 32 in a position illustrated in Figure 1: An operator stands upon the platform 32 and faces the actuator 64. If he grasps the handle 90 and rotates it in a counterclockwise direction about the axis of body 66 and rod 94, simultaneous rotation of sleeve 84 and flange 88 causes the pivoted arm 100 to rotate in the same direction, thereby pivoting the link member 108 about the pivot pin 124 in the clockwise direction as viewed in Figure 3. Since the connecting member 114, 116, 118 is secured pivotally to the valve housing 40 by pivot pin 124, this clockwise rotation of the link member 108 causes the pivot connection 120 to move upwardly, thereby moving the valve 46 outwardly from the neutral position illustrated. Linear movement of pivot pin 120 is permitted by virtue of the pivot connection 126 for the link 122. As indicated hereinbefore, outward movement of valve 46 supplies fluid pressure to the turntable motor to cause rotation of the turntable 16 in the counterclockwise direction indicated by arrow 34'. Conversely, by rotating the handle 90 in a clockwise direction about the axis of housing 66, the link member 108 is pivoted counterclockwise (Figure 3) about pivot pin 124 and pivot pin 120 is drawn downwardly, moving the valve 46 inwardly from the neutral position and rotating the turntable in the clockwise direction indicated by arrow 34.

As the operator pulls the handle 90 toward him, as he faces the assembly from the platform 32, the body 66 is pivoted about the pivot bolts 72, in the counterclockwise direction on the axis of pivot pin 98 (Figure 2). This rotation causes the link 76 and valve 52 to move downwardly from the neutral position of the latter, thereby admitting fluid pressure to the cylinder 24 associated with the bracket 18 and lower boom member 20, causing outward movement of the platform 32 in the direction of arrow 36. Conversely, by pushing the handle 90 away from the operator, i. e. toward the vertical axis of turntable 16, the body 66 is pivoted in a clockwise direction about the axis of pivot pin 98, thereby moving valve 52 outwardly from the neutral position and moving the boom member 20 in the direction to draw the platform 32 toward the turntable, in the direction of arrow 36'.

When the operator pushes the handle 90 downward, arcuately about pivot pin 92, rod 94 and valve 58 are moved downwardly from the neutral position of the latter. In this position of the valve, fluid pressure is supplied to the cylinder associated with the lower boom member 20 and upper boom member 28 in such manner as to pivot the latter downwardly and move the platform 32 downward in the direction of arrow 38. Conversely, when the handle 90 is pivoted upwardly about pivot pin 92, the valve 58 is drawn outwardly from its neutral position, causing the platform 32 to be moved upwardly in the vertical direction of arrow 38'.

Thus, it is apparent that the platform will be moved in the same direction that the actuator handle 90 is moved, and since the control valves are independent of each other, they may be actuated independently or simultaneously to move the platform in one direction only, or in a direction involving the simultaneous operation of two or more of the drive motors. That is to say, the vertical movement of platform 32 in the direction of arrows 38, 38' is arcuate about pivot shaft 30, and the radial movement of the platform in the direction of arrows 36, 36' is arcuate about pivot shaft 32. Substantially linear movement may be achieved by activating both of the motors associated with these boom members, by proper manipulation of the actuator handle 90. It will be understood, of course, that such manipulation may also include rotation of the handle on the axis of rod 94 to provide a desired rotational component of movement to the platform 32.

One particular use of the boom assembly shown in Figure 1 resides in the construction and maintenance of electric power lines. For this use it is desirable that the work platform 32 and enclosing guard framework be constructed of electrically nonconducting material such as fiber glass or other suitable substance. Moreover, it is desirable that the single actuator 64 be separted electrically from the multiple valve assembly since the latter is connected electrically to the booms and vehicle through the flexible metal hydraulic lines which interconnect the valve assembly and the source of hydraulic fluid.

Figure 4:
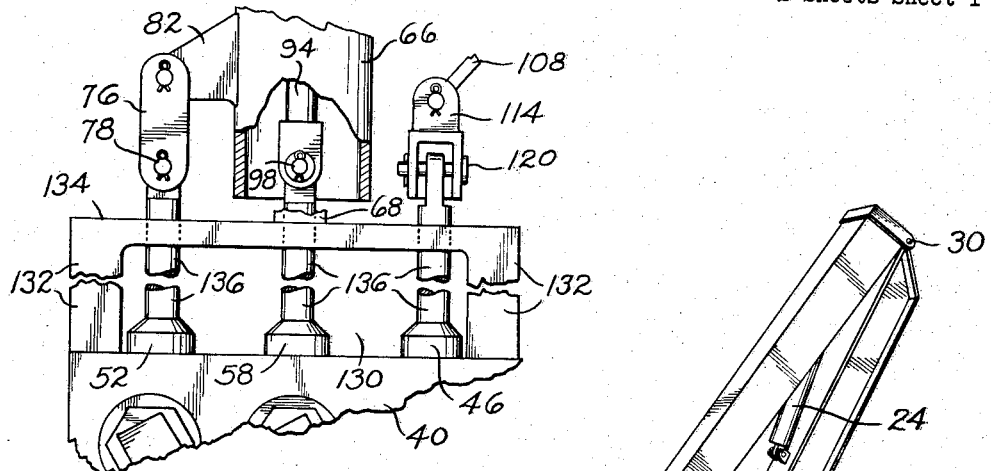
Figure 4 is a fragmentary foreshortened view in side elevation illustrating a manner in which the actuator and multiple valve may be separated electrically from each other.

Accordingly, referring to Figure 4 of the drawings, the multiple valve housing 40 preferably is mounted upon the base plate 130 of an electrically non-conducting housing, the latter including side walls 132, top wall 134 and a protective cover (not shown). The single actuator assembly 64 is mounted upon the top wall 134, rather than upon the valve housing 40 as previously described, and the valves 46, 52 and 58 are connected to their respective pivots 120, 78 and 98 by electrically non-conducting rods 136 which extend through openings provided in the top wall 134. The electrically non-conducting housing and rods 136 thereby effectively isolate the actuator and valve assemblies electrically from each other.

Those skilled in the art will recognize that various modifications and changes in the details of construction illustrated and described herein may be made without departing from the scope and spirit of this invention. For example, the single actuator may be applied to multi-valve assemblies in which the valves, similar to valves 46, 52, 58, are rotated axially, rather than movable longitudinally, to opposite sides of a neutral position for reversing the direction of fluid pressure flow to a reversible motor. In such instances the pivot pin connections 120, 78, 98 of the actuator to the valves 46, 52, 58, respectively, may be replaced by such means as rack and pinion assemblies or cam assemblies to translate the vertical motion of the actuator members into rotational motion of the valves.

As a second example of modification, there are many forms of electrical switches having reciprocating or rotating plungers which function in a manner analogous to the valves described hereinbefore to control the reversible operation of electrically actuated motors or other devices. It will be apparent that the single actuator may be employed with such electric switches to provide the operation described hereinbefore. Thus, the single actuator of the present invention may be employed with a plurality of various types of control devices provided each of said control devices is operated by a control member which is movable, either rotatably or longitudinally, to opposite sides of a neutral position.

Since the foregoing and other modifications may be made, as desired, it is to be understood that the foregoing description is primarily illustrative of the invention and is not to be considered as limiting the scope thereof.

Having now described my invention and the manner in which the same may be used, what I claim as new and desire to secure by Letters Patent is:

1. For use with a plurality of control devices mounted upon a common support and each having a control member movable rectilinearly to control the reversible movement of a power driven object in a different direction with respect to a base: a single actuator for said control devices, comprising a body mounted on said common support, a handle member mounted pivotally and rotatably on the body, first connector means adapted for connection to the control member of a control device, first link means pivotally interconnecting the handle member and the first connector means for moving the latter rectilinearly by and parallel to the axis of rotation of the handle member, second connector means adapted for connection to the control member of a second control device, and second link means pivotally interconnecting the handle member and the second connector means for moving the latter rectilinearly by pivoting the handle member.

2. For use with a plurality of control devices mounted upon a common support and each having a control member movable rectilinearly to control the reversible movement of a power driven object in a different direction with respect to a base: a single actuator for said control devices, comprising a body mounted pivotally on said common support, first connector means adapted for connection to the control member of a control device, first link means pivotally interconnecting the body and the first connector means for moving the latter rectilinearly by pivoting the body, a handle member mounted pivotally on the body on an axis parallel to the pivot axis of the body, second connector means adapted for connection to the control member of a second control device, and second link means pivotally interconnecting the handle member and the second connector means for moving the latter rectilinearly by pivoting the handle member.

3. For use with a plurality of control devices mounted upon a common support and each having a control member movable rectilinearly to control the reversible movement of a power driven object in a different direction with respect to a base: a single actuator for said control devices, comprising a body mounted pivotally on said common support, first connector means adapted for connection to the control member of a control device, first link means pivotally interconnecting the body and the first connector means for moving the latter rectilinearly by pivoting the body, a handle member mounted rotatably on the body, second connector means adapted for connection to the control member of a second control device, and second link means pivotally interconnecting the handle member and the second connector means for moving the latter rectilinearly by and parallel to the axis of rotation of the handle member.

4. For use with a plurality of control devices mounted upon a common support and each having a control member movable rectilinearly to control the reversible movement of a power driven object in a different direction with respect to a base: a single actuator for said control devices, comprising a body mounted pivotally on said common support, first connector means adapted for connection to the control member of a control device, first link means pivotally interconnecting the body and the first connector means for moving the latter rectilinearly by pivoting the body, a handle member mounted pivotally and rotatably on the body, second connector means adapted for connection to the control member of a second control device, second link means pivotally interconnecting the handle member and the second connector means for moving the latter rectilinearly by rotating the handle member, third connector means adapted for connection to the control member of a third control device, and third link means pivotally interconnecting the handle member and the third connector means for moving the latter rectilinearly by pivoting the handle member.

5. For use with a plurality of control devices mounted upon a common support and each having a control member movable rectilinearly to control the reversible movement of a power driven object in a different direction with respect to a base: a single actuator for said control devices, comprising a hollow body mounted pivotally on said common support, first connector means adapted for connection to the control member of a control device, first link means pivotally interconnecting the body and the first connector means for moving the latter rectilinearly by pivoting the body, a sleeve member mounted on the body for axial rotation, a handle member mounted pivotally on the sleeve member, second connector means adapted for connection to the control member of a second control device, second link means pivotally interconnecting the sleeve member and the second connector for moving the latter rectilinearly by rotating the handle member, third connector means adapted for connection to the control member of a third control device, rod means extending through the hollow body and pivotally interconnecting the handle member and the third connector means for moving the latter rectilinearly by pivoting the handle member.

6. For use with a plurality of control devices mounted upon a common support and each having a control member movable rectilinearly to control the reversible movement of a power driven object in a different direction with respect to a base: a single actuator for said control devices, comprising a body mounted pivotally on said common support, first connector means adapted for connection to the control member of a control device, link means pivotally interconnecting the body and the first connector means for moving the latter rectilinearly by pivoting the body, a sleeve member mounted on the body for axial rotation, a handle member mounted pivotally on the sleeve member on an axis parallel to the pivot axis of the body, second connector means adapted for connection to the control member of a second control device, connecting means pivotally interconnecting the sleeve member and the second connector means for moving the latter rectilinearly by and parallel to the axis of rotation of the handle member, third connector means adapted for connection to the control member of a third control device, rod means pivotally interconnecting the handle member and the third connector means for moving the latter rectilinearly by pivoting the handle member.

7. In combination with a plurality of control devices mounted upon a common support and each having a control member movable rectilinearly to control the reversible movement of a power driven object in a different direction with respect to a base, the first control device controlling rotational movement of the object, the second control device controlling vertical movement of the object: a single actuator for said control devices, comprising a body mounted on said common support, a handle member mounted pivotally and rotatably on the body for movement in a substantially vertical plane and for rotation on a substantially vertical axis, respectively, connecting means pivotally interconnecting the handle member and the control member of the first of said control devices for moving said control member rectilinearly by and parallel to the axis of rotation of the handle member, whereby to effect rotational movement of the object, and means pivotally interconnecting the handle member and the control member of the second of said control devices for moving said control member rectilinearly by pivoting the handle member in said vertical plane, whereby to effect vertical movement of the object.

8. In combination with a plurality of control devices mounted upon a common support and each having a control member movable rectilinearly to control the reversible movement of a power driven object in a different direction with respect to a base, the first control device controlling transverse movement of the object, the second control device controlling vertical movement of the object: a single actuator for said control devices, comprising a body mounted pivotally on said common support for movement in the transverse direction of the object, means pivotally interconnecting the body and the control member of the first of said control devices for moving said control member rectilinearly by pivoting the body, whereby to effect transverse movement of the object, a handle member mounted pivotally on the body on an axis parallel to the pivot axis of the body for movement in a substantially vertical plane, and means pivotally interconnecting the handle member and the control member of the second of said control devices for moving said control member rectilinearly by pivoting the handle member in said vertical plane, whereby to effect vertical movement of the object.

9. In combination with a plurality of control devices mounted upon a common support and each having a control member movable rectilinearly to control the reversible movement of a power driven object in a different direction with respect to a base, the first control device controlling transverse movement of the object, the second control device controlling rotational movement of the object: a single actuator for said control devices, comprising a body mounted pivotally on said common support for movement in the transverse direction of the object, means pivotally interconnecting the body and the control member of the first of said control devices for moving said control member rectilinearly by pivoting the body, whereby to effect transverse movement of the object, a handle member mounted rotatably on the body for rotation on a substantially vertical axis, and connecting means pivotally interconnecting the handle member and the control member of the second of said control devices for moving said control member rectilinearly by and parallel to the axis of rotation of the handle member, whereby to effect rotational movement of the object.

10. In combination with a plurality of control devices mounted upon a common support and each having a control member movable rectilinearly to control the reversible movement of a power driven object in a different direction with respect to a base, the first control device controlling transverse movement of the object, the second control device controlling rotational movement of the object, the third control device controlling vertical movement of the object: a single actuator for said control devices, comprising a body mounted pivotally on said common support for movement in the transverse direction of the object, means pivotally interconnecting the body and the control member of the first of said control devices for moving said control member rectilinearly by pivoting the body, whereby to effect transverse movement of the object, a handle member mounted pivotally and rotatably on the body for movement in a substantially vertical plane and for rotation on a substantially vertical axis, respectively, connecting means pivotally interconnecting the handle member and the control member of the second of said control devices for moving said control member rectilinearly by rotating the handle member, whereby to effect rotational movement of the object, and means pivotally interconnecting the handle member and the control member of the third of said control devices for moving said control member rectilinearly by pivoting the handle member in said vertical plane, whereby to effect vertical movement of the object.

11. In combination with a plurality of control devices mounted upon a common support and each having a control member movable rectilinearly to control the reversible movement of a power driven object in a different direction with respect to a base, the first control device controlling transverse movement of the object, the second control device controlling rotational movement of the object, the third control device controlling vertical movement of the object: a single actuator for said control devices, comprising a hollow body mounted pivotally on said common support for movement in the transverse direction of the object, link means pivotally interconnecting the body and the control member of the first of said control devices for moving said control member rectilinearly by pivoting the body, whereby to effect transverse movement of the object, a sleeve member mounted on the body for rotation on a vertical axis, a handle member mounted pivotally on the sleeve member for movement in a substantially vertical plane and for rotation on a substantially vertical axis, connecting means pivotally interconnecting the sleeve member and the control member of the second of said control devices for moving said control member rectilinearly by rotating the handle member, whereby to effect rotational movement of the object, rod means extending through the hollow body and pivotally connected at one end to the handle member, and means pivotally interconnecting the rod means and the control member of the third of said control devices for moving said control member rectilinearly by pivoting the handle member in said vertical plane, whereby to effect vertical movement of the object.

References Cited in the file of this patent
UNITED STATES PATENTS

| | | |
|---|---|---|
| 2,222,204 | Newman | Nov. 19, 1940 |
| 2,448,675 | Loewe | Sept. 7, 1948 |
| 2,705,971 | Dorkins | Apr. 12, 1955 |
| 2,745,506 | McCallum | May 15, 1956 |